United States Patent
Takahara et al.

[11] Patent Number: 5,835,459
[45] Date of Patent: Nov. 10, 1998

[54] OPTICAL DISC APPARATUS FOR RECORDING AND REPRODUCING DATA ONTO AND FROM AN OPTICAL DISC WITH GROOVES AND LANDS

[75] Inventors: Tamane Takahara, Tokyo; Masahiko Tanaka; Mikio Yamamuro, both of Yokohama, all of Japan

[73] Assignee: Kabushiki Kaisha Toshiba, Kawasaki, Japan

[21] Appl. No.: 736,235

[22] Filed: Oct. 23, 1996

[30] Foreign Application Priority Data

Oct. 24, 1995 [JP] Japan .................................. 7-275790

[51] Int. Cl.[6] .................................................. G11B 7/09
[52] U.S. Cl. ..................... 369/44.28; 369/44.29
[58] Field of Search ............................ 369/44.26, 44.28, 369/44.29, 44.27, 54, 44.35, 44.34

[56] References Cited

U.S. PATENT DOCUMENTS

| | | |
|---|---|---|
| 4,423,502 | 12/1983 | Dil . |
| 4,974,220 | 11/1990 | Harada . |
| 5,199,022 | 3/1993 | Suzuki et al. . |
| 5,444,682 | 8/1995 | Yamada et al. ...................... 369/44.28 |
| 5,448,551 | 9/1995 | Miyagawa et al. ..................... 369/116 |
| 5,475,662 | 12/1995 | Miyagawa et al. ................... 369/44.26 |
| 5,508,995 | 4/1996 | Moriya et al. ........................ 369/275.4 |
| 5,568,461 | 10/1996 | Nishiuchi et al. ................... 369/44.26 |

FOREIGN PATENT DOCUMENTS

| | | |
|---|---|---|
| 525775 | 2/1993 | European Pat. Off. . |
| 607445 | 7/1994 | European Pat. Off. . |
| 63-57859 | 11/1988 | Japan . |

OTHER PUBLICATIONS

Patent Abstract of Japan, vol.006, No. 125(P–127) Jul. 1982 re JP–A 57 050330.
Patent Abstract of Japan, vol. 012 No. 290(P–742) Aug. 1988 re JP–A 63 066734.
Patent Abstract of Japan, vol. 009 No. 024 (P–331) Jan. 1985 re JP–A 59 168939.

*Primary Examiner*—Thang V. Tran
*Attorney, Agent, or Firm*—Cushman Darby & Cushman IP Group of Pillsbury Madison & Sutro LLP

[57] ABSTRACT

In a case where tracking control is carried out by a lens actuator in performing a tracking pull-in operation in which tracking control is started in the state where tracking control is out of operation, the tracking control circuit brings control into stable tracking control by moving the light spot onto a groove on the optical disc. After that, when tracking onto a land is needed, the tracking control circuit moves the light spot onto the land. This enables a pull-in action toward a stable tracking operation.

16 Claims, 9 Drawing Sheets

OPTICAL DISC APPARATUS FOR RECORDING AND REPRODUCING DATA ONTO AND FROM AN OPTICAL DISC WITH GROOVES AND LANDS

BACKGROUND OF THE INVENTION

1. Field of the Invention

This invention relates to an optical disc apparatus for recording and/or reproducing data onto and from an optical disc having grooves and lands.

2. Description of the Related Art

Data processing apparatuses, such as optical disc apparatuses, have been put to practical use. The optical disc apparatus records the data onto an optical disc (an information recording medium) with recording tracks or reproduces the data recorded on the optical disc by means of the laser beam outputted from the laser diode provided on the optical head or in the apparatus.

In recent years, to improve the recording density further, the techniques for writing and reading the data onto and from both of the grooves and lands have been developed. In the prior art, the data was written only on the grooves or the lands (between grooves).

Many optical disc apparatuses provide positioning control of the laser beam over a wide range with high accuracy by driving the beam in the direction perpendicular to the tracks on the optical disc through the cooperative operation of a small displacement range actuator (tracking actuator) and a large displacement range actuator.

For such control, an optical sensor is used to determine the position of the light spot on the track. From the optical sensor, a tracking error signal is obtained. The optical sensor senses the balance of the laser beam intensity using two detectors or a bisectional detector.

For example, in a tracking servo system using a sensing method known as the push-pull method, an offset occurs in the tracking error signal obtained from the optical sensor.

A lens actuator which moves only the objective lens is one of the tracking actuators. Because the relative position between the objective lens and the optical sensor changes when the light spot moves across the track by the objective lens driven by the lens actuator, the laser beam deviates from the center of the optical sensor. As a result, the amount of light incident on the optical sensor has lost its balance to one side, causing an offset in the tracking error signal. This offset differs from an error resulting from the deviation of the detector from the objective lens caused during the assembly of the apparatus.

As described above, when the light spot is deviated by the lens actuator from the center of the optical sensor, an offset occurs in the tracking error signal. When the polarity of the offset caused by the lens actuator driven in one direction does not coincide with the polarity of the tracking error signal caused when the light spot deviates from the center of the groove or the center of the land on the optical disc by the lens actuator driven in the direction opposite to the aforesaid direction, the movement of the lens actuator becomes greater, introducing the danger of ruining the tracking operation.

The aforementioned problem of the conventional method is summarized as follows.

While the light spot is deviated by the lens actuator from the center of the optical sensor, an offset occurs in the tracking error signal. When the polarity of the offset of the tracking error signal caused by the lens actuator driven in one direction is opposite to the polarity of the tracking error signal caused while the light spot deviates from the center of groove or the center of the land on the optical disc by the lens actuator driven in the direction opposite to the aforementioned direction, the movement of the lens actuator increases, introducing the danger of ruining the tracking operation. When the lens actuator starts a tracking operation in the state where it has not been in a tracking operation, there is a particularly strong possibility that the tracking operation will fail. The same problem arises in a configuration where a galvanomirror is used to move the light spot instead of the lens actuator.

SUMMARY OF THE INVENTION

Accordingly, it is the object of the present invention to provide an optical disc apparatus capable of performing a tracking operation stably when obtaining a tracking error signal at an optical sensor that senses the balance of the laser beam intensity and then effects tracking control.

According to an aspect of the present invention, there is provided an optical disc apparatus comprising laser beam projecting means for projecting a laser beam on the grooves formed concentrically on a recording medium or on the lands between the grooves so as to form a light spot; light spot moving means for moving the light spot formed by the laser beam projecting means in the tracking direction crossing the grooves or lands at right angles; sensing means for sensing the imbalance of the diffracted light intensity due to the groove or lands by receiving the reflected laser beam from the recording medium on which the laser beam has been projected from the laser beam projecting means; output means for, on the basis of the sensing result of the sensing means, outputting a tracking error signal indicating positional information on the light spot with respect to the grooves or lands in the tracking direction; and control means that controls the operation of the light spot moving means on the basis of the tracking error signal and that includes means for moving the light spot to either the groove or land for which the polarity of the tracking error signal outputted from the output means when the light spot is deviated from the center of a groove or land on the recording medium by the small displacement actuator driven in one direction coincides with the polarity of the offset contained in the tracking error signal, when the light spot has been formed in a manner that deviates from the center of the sensor by the small displacement range actuator driven in the opposite direction to the aforementioned direction, and thereafter, moving the light spot to the target groove or land.

With the optical disc apparatus, the control means may include means for performing a tracking pull-in operation in which tracking control is started in the state where tracking control is out of operation. The tracking error signal may change its polarity at the center of the groove or land acting as borderline. In this case, the tracking error signal may contain an offset that develops as a result of the deviation of the light spot and changes its polarity, depending on the direction of the light spot deviation.

According to another aspect of the present invention, there is provided an optical disc apparatus comprising an objective lens for projecting a laser beam on the grooves formed concentrically on a recording medium or on the lands between the grooves so as to form a light spot; light spot moving means for moving the light spot in the tracking direction crossing the grooves or lands at right angles by moving the objective lens in the direction perpendicular to the optical axis; sensing means for sensing the imbalance of the diffracted light intensity due to the grooves or lands by receiving the reflected laser beam from the recording medium on which the laser beam has been projected from the objective lens; output means for, on the basis of the sensing result of the sensing means, outputting a tracking error signal indicating positional information on the light spot with respect to the grooves or lands in the tracking direction; and control means that controls the operation of the light spot moving means on the basis of the tracking error signal and that includes means for moving the light spot to trace the groove, and thereafter, moving the light spot to either the target groove or land.

With the optical disc apparatus, the control means may include means for performing a tracking pull-in operation in which tracking control is started in the state where tracking control is out of operation. The control means may include means for, when tracking onto a land is needed in performing the tracking pull-in operation, moving the light spot to a groove near the target land and then moving the light spot to the target land. The tracking error signal may change its polarity at the center of the groove or land acting as a borderline. In this case, the tracking error signal may contain an offset that develops as a result of the deviation of the light spot and changes its polarity, depending on the direction of the light spot deviation.

According to another aspect of the present invention, there is provided an optical disc apparatus comprising a galvanomirror for projecting a laser beam on the grooves formed concentrically on a recording medium or on the lands between the grooves so as to form a light spot; light spot moving means for moving the light spot in the tracking direction crossing the grooves or lands at right angles by rotating the galvanomirror; sensing means for sensing the imbalance of the diffracted light intensity due to the grooves or lands by receiving the reflected laser beam from the recording medium on which the laser beam has been projected by the galvanomirror; output means for, on the basis of the sensing result of the sensing means, outputting a tracking error signal indicating positional information on the light spot with respect to the grooves or lands in the tracking direction; and control means that controls the operation of the light spot moving means on the basis of the tracking error signal and that includes means for moving the light spot to trace the land, and thereafter, moving the light spot to either the target groove or land.

With the above optical disc apparatus, the control means may include means for performing a tracking pull-in operation in which tracking control is started in the state where tracking control is out of operation. The control means may include means for, when tracking onto a groove is needed in performing the tracking pull-in operation, moving the light spot to a land near the target groove and then moving the light spot to the target groove. The tracking error signal may change its polarity at the center of the groove or land acting as borderline. In this case, the tracking error signal may contain an offset that develops as a result of the deviation of the light spot and changes its polarity, depending on the direction of the light spot deviation.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Hereinafter, referring to the accompanying drawings, embodiments of the present invention will be explained.

<First Embodiment>

Figure 1:
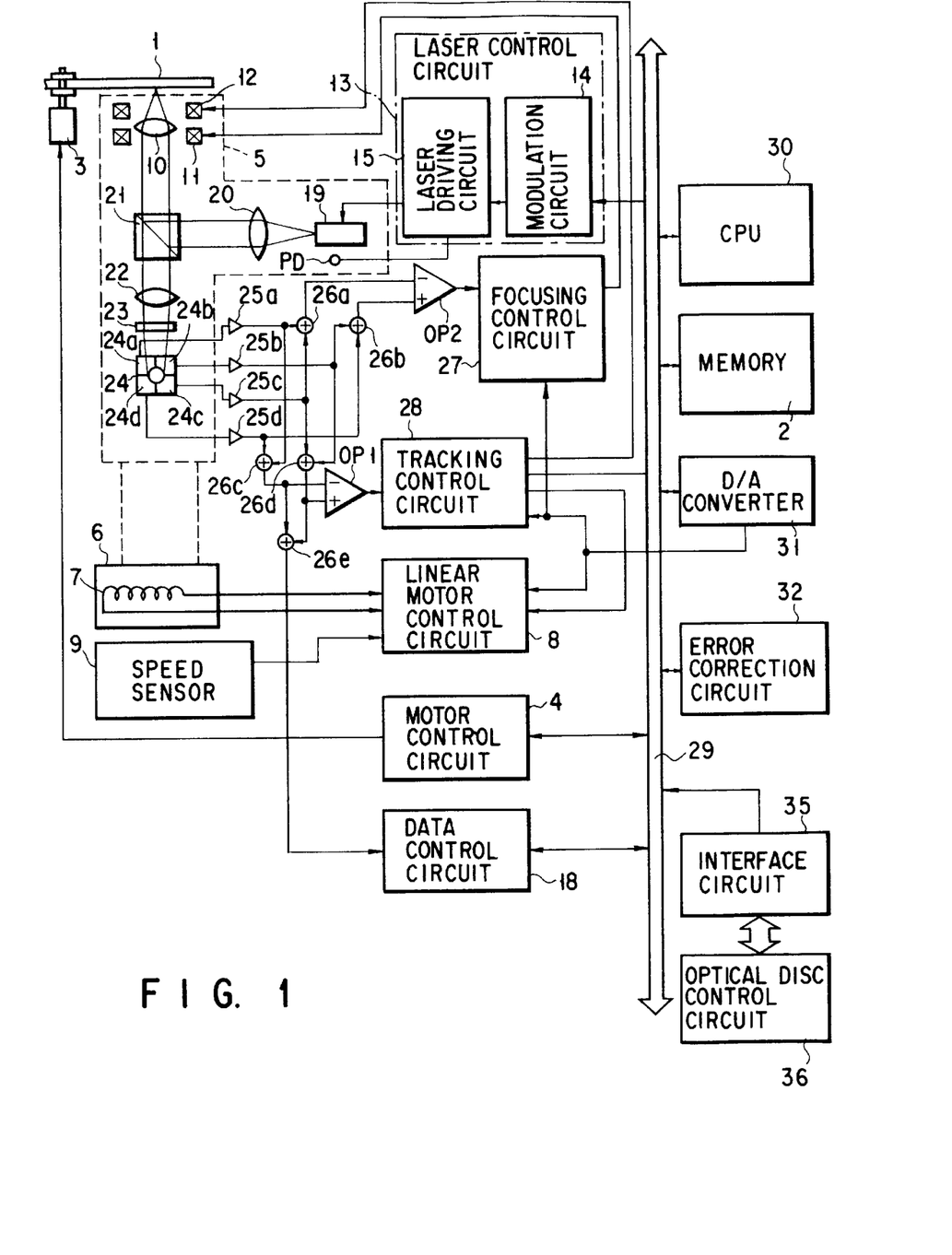
FIG. 1 is a schematic block diagram of an optical disc apparatus according to a first embodiment of the present invention.

FIG. 1 shows an optical disc apparatus as an information recording and/or reproducing apparatus. The optical disc apparatus records the data (information) onto an optical disc 1 or reproduces the recorded data from the optical disc using a laser beam from a laser diode.

At the surface of the optical disc 1, grooves and lands are formed spirally or concentrically.

The optical disc 1 may be of the pit type, or of the recording-layer type using phase change, or of the polyphase recording-film type. A magneto-optical disc may be used as the optical disc 1. For each of these types, the configuration of the optical head and related circuitry is modified suitably. Here, the places on the optical disc where signals have been recorded are called tracks. Each track is made up of grooves and lands, or only grooves, or only lands.

In FIG. 1, the optical disc 1 is rotated by a motor 3 at, for example, a constant speed. The motor 3 is controlled by a motor control circuit 4.

The recording and reproducing of information onto and from the optical disc 1 are effected by the optical head 5. The optical head 5 is attached to the movable section of a linear motor 6 including a driving coil 7. The driving coil 7 is connected to a linear motor control circuit 8.

Connected to the linear motor control circuit 8 is a speed sensor 9, which is designed to supply the speed signal of the optical head 5 to the linear motor control circuit 8.

The fixed section of the linear motor 6 is provided with a permanent magnet (not shown). The optical head 5 is designed to move in the direction of the radius of the optical disc 1 as a result of the driving coil 7 being excited by the linear motor control circuit 8.

In the optical head 5, an objective lens 10 is supported by a wire or a plate spring (not shown). The objective lens 10 is moved in the focusing direction (in the direction of the optical axis of the lens) by a driving coil 11 and can be moved in the tracking direction (in the direction perpendicular to the optical axis of the lens) by a driving coil 12.

A laser control circuit 13 drives a laser diode 19, which generates laser light. The laser control circuit 13 is composed of a modulation circuit 14 and a laser driving circuit 15 and operates in synchronization with the recording clock signal from a PLL (Phase-Locked Loop) circuit (not shown). The PLL circuit divides the basic clock signal from an oscillator (not shown) into frequencies corresponding to the recording positions and generates a recording clock signal.

The modulation circuit 14 modulates the recording data supplied from an error correction circuit 32 (explained later) into the signal suitable for recording, that is, 2–7 modulation data. The laser driving circuit 15 drives the laser diode 19 in the optical head 5 according to the 2–7 modulation data modulated at the modulation circuit 14.

The laser light generated by the laser diode 19 driven by the laser driving circuit 15 in the laser control circuit 13 is projected on the optical disc 1 via a collimator lens 20, a beam splitter 21, and the objective lens 10. The reflected light from the optical disc 1 is directed to an optical sensor 24 via the objective lens 10, the beam splitter 21, a condenser lens 22, and a cylindrical lens 23.

The optical sensor 24 is composed of quadrant light sensing cells 24a to 24d.

The output signal of the light sensing cell 24a in the optical sensor 24 is supplied to one end of an adder 26a via an amplifier 25a; the output signal of the light sensing cell 24b is supplied to one end of an adder 26b via an amplifier 25b; the output signal of the light sensing cell 24c is supplied to the other end of the adder 26a via an amplifier 25c; and the output signal of the light sensing cell 24d is supplied to the other end of the adder 26b via an amplifier 25d.

The output signal of the light sensing cell 24a in the optical sensor 24 is supplied to one end of an adder 26c via the amplifier 25a; the output signal of the light sensing cell 24b is supplied to one end of an adder 26d via the amplifier 25b; the output signal of the light sensing cell 24c is supplied to the other end of the adder 26d via the amplifier 25c; and the output signal of the light sensing cell 24d is supplied to the other end of the adder 26c via the amplifier 25d.

The output signal of the adder 26a is supplied to the inverting input terminal of a differential amplifier OP2. To the noninverting input terminal of the differential amplifier OP2, the output signal of the adder 26b is supplied. This enables the differential amplifier OP2 to supply a signal related to the focal point to a focusing control circuit 27 according to the difference between the outputs of the adders 26a, 26b. The output signal of the focusing control circuit 27 is supplied to a focusing driving coil 11, which performs control so that the laser light may be always in focus on the optical disc 1.

The output signal of the adder 26c is supplied to the inverting input terminal of the differential amplifier OP1. To the noninverting input terminal of the differential amplifier OP1, the output signal of the adder 26d is supplied. This enables the differential amplifier OP1 to supply a tracking error signal to a tracking control circuit 28 according to the difference between the outputs of the adders 26c, 26d. The tracking control circuit 28 produces a tracking driving signal according to the tracking error signal supplied from the differential amplifier OP1.

The tracking driving signal outputted from the tracking control circuit 28 is supplied to the driving coil 12 in the tracking direction. The tracking error signal used in the tracking control circuit 28 is supplied to the linear motor control circuit 8.

The changes in the power of the reflected light from the pits formed on the tracks are reflected in the sum signal of the outputs of the light sensing cells 24a to 24d in the optical sensor 24, that is, the signal obtained by adding the output signals from the adders 26c, 26d at the adder 26e in the state where focusing and tracking have been effected as described above. The added signal is supplied to a data reproducing circuit 18, which reproduces the recorded data.

The data reproduced at the data reproducing circuit 18 is outputted to an error correction circuit 32 via a bus 29. The error correction circuit 32 corrects errors on the basis of the error-correcting code ECC in the reproduced data or adds the error-correcting code ECC to the recording data supplied from an interface circuit 35, and then outputs the corrected data to the memory 2.

The reproduced data whose errors have been corrected at the error correction circuit 32 is outputted to an optical disc control unit 36 (an external unit) via the bus 29 and interface circuit 35. The optical disc control unit 36 supplies the recording data to the error correction circuit 32 via the interface circuit 35 and bus 29.

While the tracking control circuit 28 is driving the objective lens 10, the linear motor control circuit 8 drives the linear motor 6 or moves the optical head 5 so that the objective lens 10 may be positioned near the central position on the optical head 5.

The optical disc apparatus is provided with a D/A converter 31 used for data exchange between the focusing control circuit 27, tracking control circuit 28, linear motor control circuit 8, and CPU 30 controlling the entire optical disc apparatus.

The motor control circuit 4, linear motor control circuit 8, laser control circuit 13, data reproducing circuit 18, focusing control circuit 27, tracking control circuit 28, and error correction circuit 32 are connected in such a manner that all of these circuits may be controlled by the CPU 30 via the bus 29. The CPU 30 is designed to perform specific operations according to the programs recorded in the memory 2.

Now, tracking control will be described in detail.

As described earlier, two actuators for tracking control are provided. Specifically, they are a tracking actuator (the driving coil 12 and related circuitry) provided to drive only the objective lens 10 in a small range in a relatively high frequency band and a linear motor 7 provided to drive the entire optical head 5 in a wide range in a relatively low frequency band.

The tracking error signal needed for tracking control is obtained as follows.

As shown in FIGS. 2A to 2D, the reflected laser beam from the optical disc 1 is sensed at the optical sensor 24. Because the reflected beam area (the 0th-order laser beam: solid line) includes a diffracted laser beam (the first-order laser beam: broken line) due to grooves on the optical disc 1, the intensity distribution in the laser beam is unbalanced, depending on the relative positional relationship between the light spot and the grooves. The imbalance is sensed from the addition result (the output of the adder 26c) of the bisected sensors, or the light sensing cells 24a, 24d and the addition result (the output of the adder 26d) of the light sensing cells 24b, 24c. The difference (the output of OP1) between these results is calculated to produce a bipolar tracking error signal as shown in FIG. 3.

The tracking error signal is zero when the light spot is at the center of the groove or at the center of the land, but otherwise, it takes a positive or a negative value, with the result that it has a sine waveform as a whole. The inclination of the tracking error signal on the groove against the light spot displacement is opposite to the inclination of the tracking error signal on the land against the light spot displacement which is the same as on groove. So, to control the light spot to trace the land or groove, the polarity of tracking control must be reversed.

Figure 2A:
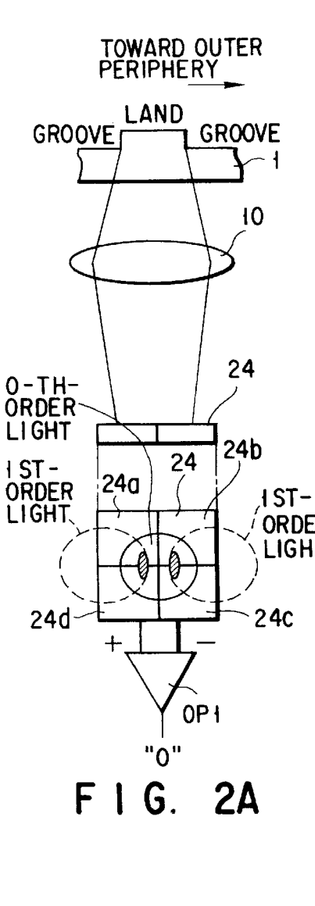
FIGS. 2A to 2D are drawings to help explain the relationship between the laser beam projected on the optical disc and the laser beam projected on the optical sensor.
Figure 2B:
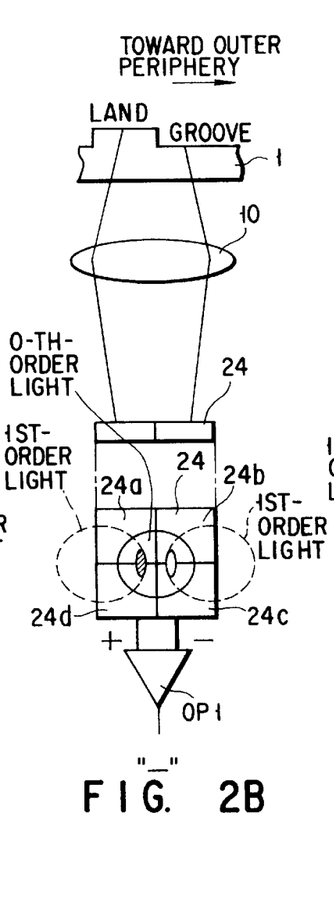
Figure 2C:
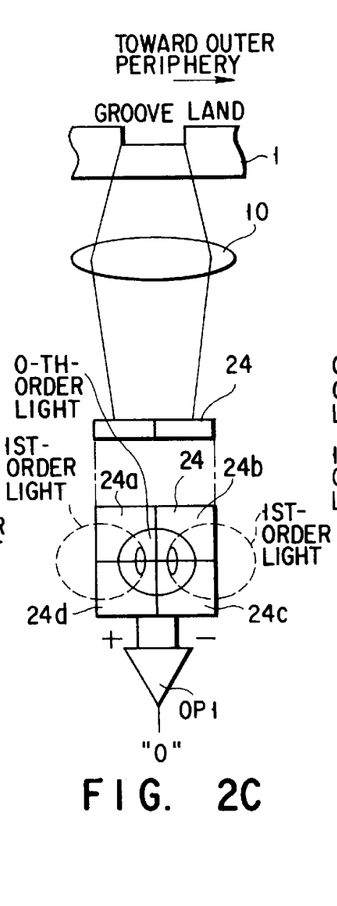
Figure 2D:
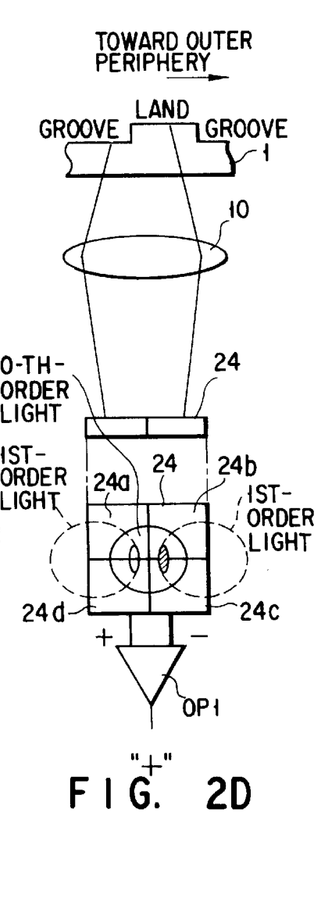
Figure 3:
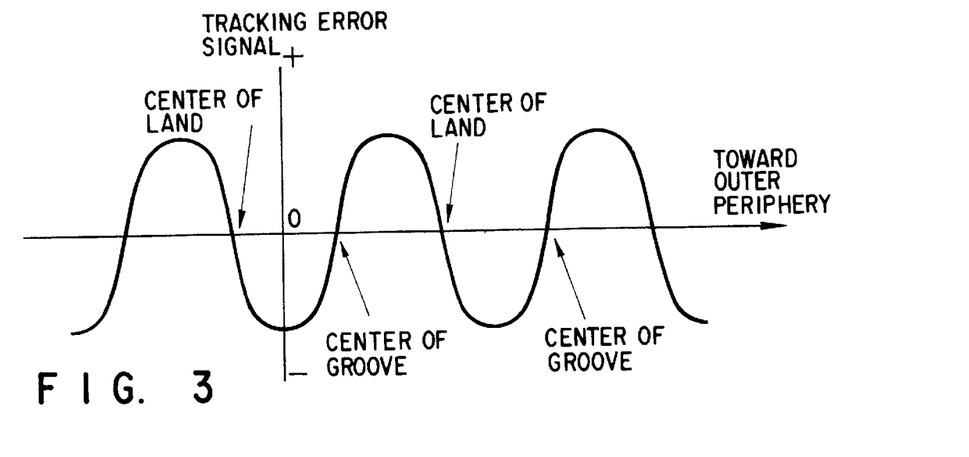
FIG. 3 is a diagram to help explain the tracking error signal.

FIGS. 2A to 2D show the relationship between the target tracking error signal (a tracking error signal containing no offset) obtained in an ideal tracking servo system, the position of the light spot in motion on the optical disc 1, and the position of the light spot on the optical sensor 24. FIG. 2A shows the relationship at the time that the light spot is positioned at the center of the land. FIG. 2B shows the relationship at the time that the light spot is located in the deviated position from the land to the outer periphery. FIG. 2C shows the relationship at the time that the light spot is positioned at the center of the groove. FIG. 2D shows the relationship at the time that the light spot is located in the deviated position from the groove to the outer periphery.

Now, by taking the lens actuator (driving coil 12 and related circuitry), one tracking actuator, as example, the offset of the tracking error signal will be explained by reference to FIGS. 4A and 4B.

Figures 4A, 4B:
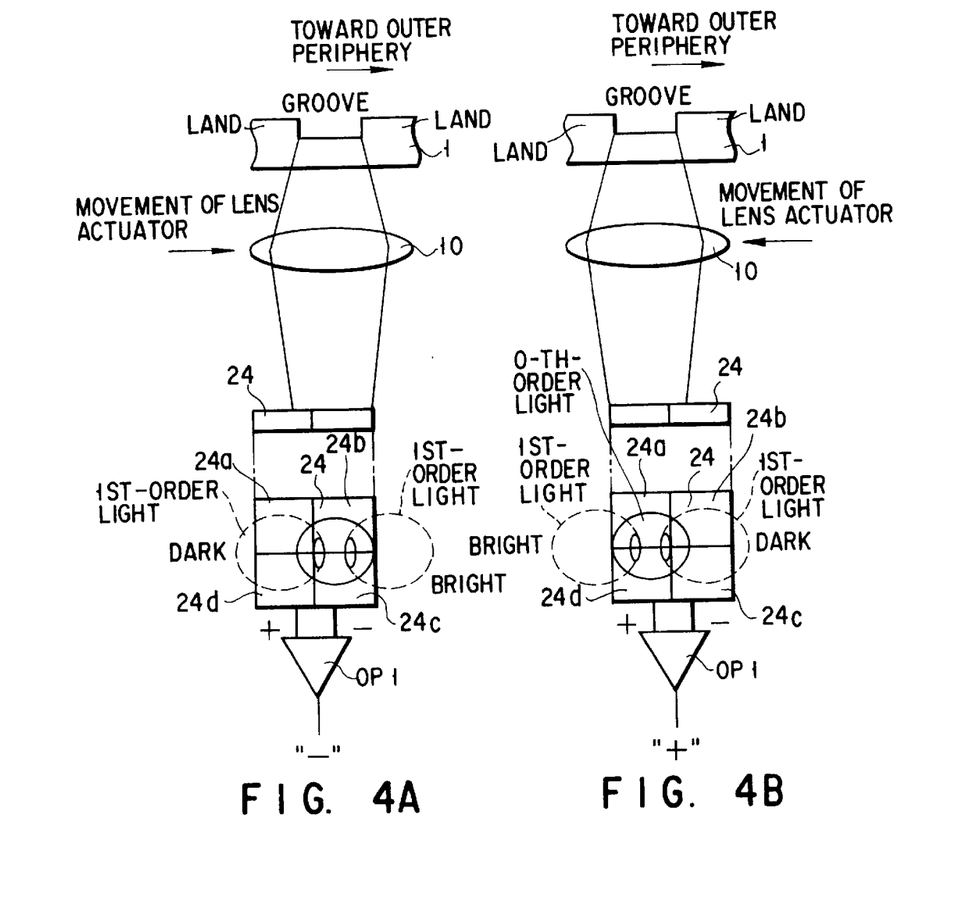
FIGS. 4A and 4B are drawings to help explain the relationship between the laser beam projected on the optical disc and the laser beam projected on the optical sensor.

FIGS. 4A and 4B show the relationship between the tracking error signal (a tracking error signal containing an offset) obtained in a tracking servo system, the position of the objective lens 10, the position of the light spot in motion on the optical disc 1, and the position of the light spot on the optical sensor 24. FIG. 4A shows the relationship at the time that the lens actuator is driven to the outer periphery to move the light spot to reach the center of the land on the optical disc 1. FIG. 4B shows the relationship at the time that the lens actuator is driven to the inner periphery to move the light spot to reach the center of the land on the optical disc.

The movement of the lens actuator or driving coil 12 causes the objective lens 10 to move (operate), which changes the relative position between the objective lens 10 and the optical sensor 24 leading to the deviation of the light beam from the center of the optical sensor 24. As a result, the amount of light incident on the optical sensor has lost its balance to one side. For instance, even when the light spot is on the land (or the groove), the tracking error signal does not become zero and has a value of "a". This is called the offset of the tracking error signal. The polarity of "a" depends on the direction in which the laser beam incident on the optical sensor 24 is shifted, regardless of whether the light spot is on the groove or land. When an offset occurs in the tracking error signal in this way, the output "a" of the offset of the tracking error signal due to the positional shift of the objective lens 10 causes current to flow through the driving coil 12.

Consequently, depending on the polarity of the offset of the tracking error signal, the objective lens 10 may return to the physical central position or conversely may move in the direction in which the positional shift increases.

With the configurations shown in FIGS. 2A to 2D and FIGS. 4A and 4B, when the position of the light spot deviates from the center of the land toward the outer periphery of the optical disc 1 as shown in FIG. 2B under the influence of, for example, a disturbance while tracking is being done toward the center of the land, a "−" polarity tracking error signal is produced. Then, by moving the objective lens 10 on the basis of this signal, the light spot is moved toward the inner periphery of the optical disc 1 as shown in FIG. 4B.

When the driving coil 12 causes the objective lens 10 to move toward the inner periphery, a "+" polarity offset occurs in the tracking error signal. At this time, when the absolute value of the offset of the tracking error signal is greater than the absolute value of the original tracking error signal, the driving coil 12 tries to cause the objective lens 10 to move toward the outer periphery, so that the light spot deviates from the center of the land much more, making the tracking control unstable.

When tracking control is started in the state where tracking control is out of operation (at the time of tracking pull in), the lens actuator may move greatly because the light spot often deviates substantially from the center of the land. Therefore, there is a particularly strong possibility that the tracking operation will fail at the time of tracking pull in.

Conversely, in a case where tracking is done onto a groove, when the position of the light spot deviates from the center of the groove toward the outer periphery of the optical disc 1 under the influence of disturbance or the like as shown in FIG. 2D, the tracking error signal becomes "+". Since the polarity of control is opposite to that in tracking on the land, the objective lens 10 is moved in this case, too, which moves the lens actuator as shown in FIG. 4B, thereby moving the light spot toward the inner periphery of the optical disc 1.

Furthermore, the offset of the tracking error signal produced at the time that the light spot is moved by the lens actuator toward the inner periphery is also has the "+" polarity. Therefore, in a case where tracking is done on a groove, even when the position of the objective lens 10 deviates from the original position, negative feedback is applied correctly to the lens actuator, which then attempts to return to the original position. As a result, such an unstable phenomenon as is found in tracking onto a land does not occur, achieving stable control.

This makes it possible to start the tracking operation reliably on the groove in the case where tracking control is started in the state where tracking control is out of operation.

Therefore, with the first embodiment, in a case where the lens actuator is used and tracking control is started in the state where tracking control is out of operation, that is, a tracking pull-in operation is started, control is first brought into stable tracking control by moving the light spot onto a groove and thereafter when tracking onto a land is needed, the light spot is moved onto the target land. This makes it possible to pull control in a stable tracking operation.

Figure 5:
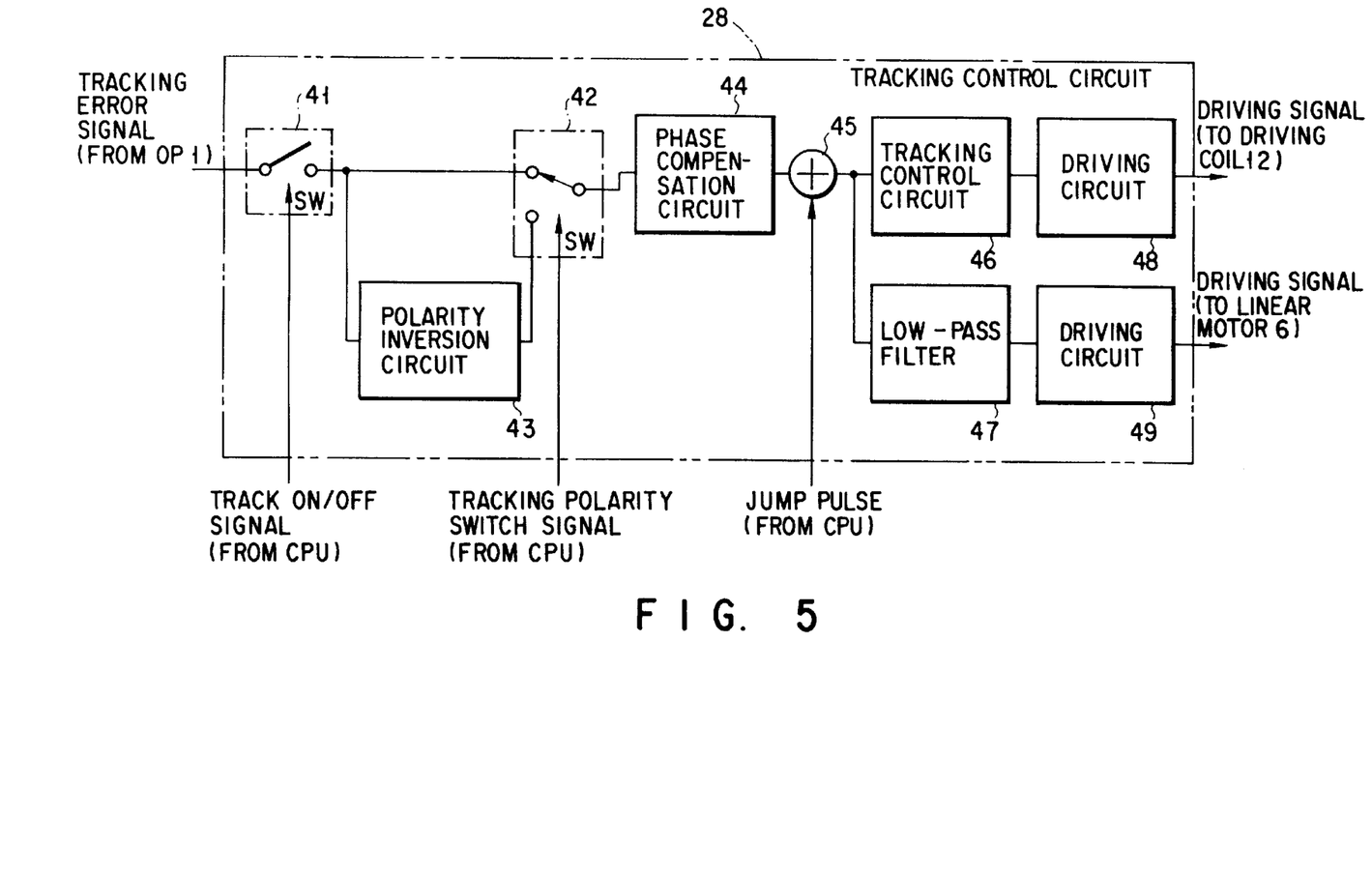
FIG. 5 is a block diagram of a tracking control circuit.

Now, the above operation will be described concretely. For example, as shown in FIG. 5, the tracking control circuit 28 comprises changeover switches 41, 42, a polarity inversion circuit 43, a phase compensation circuit 44, an adder section 45, a high-pass filter 46, a low-pass filter 47, and driving circuits 48, 49.

Figure 6A:
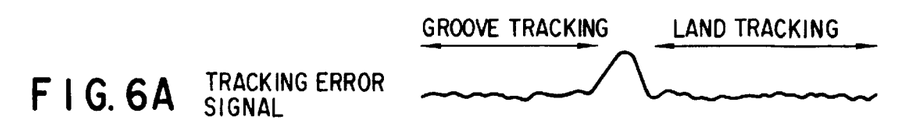
FIGS. 6A to 6D show the signal waveforms in the main part of the tracking control circuit.
Figure 6B:
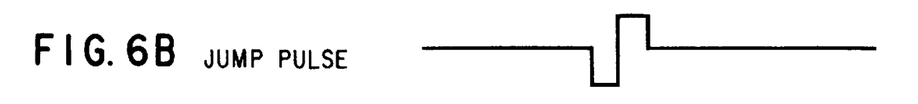
Figure 6C:
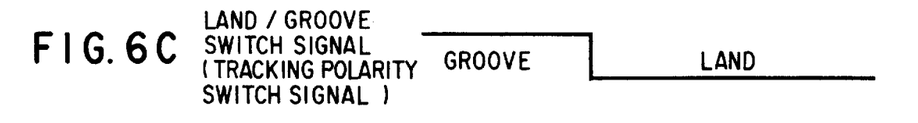
Figure 6D:
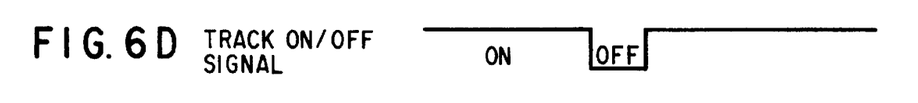

The changeover switch 41 is switched by the track on/off signal (that turns on and off the tracking servo loop) from the CPU 30 as shown in FIG. 6D. When the track on/off signal is on, the changeover switch outputs the tracking error signal from the differential amplifier OP1 as shown in FIG. 6A to the changeover switch 42 and the polarity inversion circuit 43.

The changeover switch 42 is switched by the tracking polarity switch signal (land/groove switch signal) from the CPU 30 as shown in FIG. 6C. When the polarity of the tracking polarity switch signal is that of the groove, the changeover switch 42 outputs the tracking error signal to the phase compensation circuit 44. When the polarity of the tracking polarity switch signal is that of the land, the switch 42 outputs the tracking error signal whose polarity is inverted at the polarity inversion circuit 43 to the phase compensation circuit 44.

The polarity inversion circuit 43 inverts the polarity of the tracking error signal supplied from the differential amplifier OP1 via the changeover switch 41 and supplies its output to the changeover switch 42.

The phase compensation circuit 44 compensates the positive-polarity (positive phase) tracking error signal or the negative-polarity (negative phase) tracking error signal supplied from the changeover switch 42 and outputs the resulting signal to the adder section 45.

The adder 45 adds the phase-compensated positive polarity (positive phase) tracking error signal or the phase compensated negative polarity (negative phase) tracking error signal supplied from the phase compensation circuit 44 to the jump pulse from the CPU 30 as shown in FIG. 6B. The addition result is a tracking driving signal. The adder outputs the tracking driving signal to the high-pass filter 46 and the low-pass filter 47.

The high-pass filter 46 extracts only the high-frequency band signals from the tracking driving signal from the adder section 45. The extracted signals are outputted to the driving circuit 48 that drives the lens actuator serving as an actuator having a high operating frequency band.

The low-pass filter 47 extracts only the low-frequency band signals from the tracking driving signal from the adder section 45. The extracted signals are outputted to the driving circuit 49 that drives the linear motor 6 serving as an actuator having a low operating frequency band.

The driving circuit 48 moves the objective lens 10 in the tracking direction by driving the driving coil 12 by the use of the tracking driving signal from the high-pass filter 46. Specifically, as shown in FIG. 6B, the jump pulse causes the tracking position of the laser beam to move from the groove to an adjacent land.

The driving circuit 49 moves the linear motor 6 in the tracking direction by controlling the linear motor control circuit 8 by the use of the tracking driving signal from the low-pass filter 47 and driving the driving coil 7.

Now, the processing in the above-described configuration with the optical disc 1 installed will be explained.

When an optical disc is loaded with a loading mechanism (not shown), the CPU 30 performs driving control of the motor 3 by means of the motor control circuit 4, thereby rotating the optical disc 1 at a specific number of revolutions.

Then, the optical head 5 is moved to the position facing the innermost groove on the optical disc 1 as the initial position and a focus pull-in process is carried out. Specifically, when the CPU 30 outputs a reproduction control signal to the laser control circuit 13, the laser driving circuit 15 projects the reproducing laser beam from the laser diode 19 in the optical head 5 onto the optical disc 1 via the objective lens 10. The laser beam reflected from the optical disc 1 is directed to the optical sensor 24 via the objective lens 10, beam splitter 21, condenser lens 22, and cylindrical lens 23. Then, the differential amplifier OP2 obtains a focusing signal from the difference between the sum signal of the outputs of the sensing cells 24a, 24c of the optical sensor 24 and the sum signal of the outputs of the sensing cells 24b, 24d of the optical sensor 24. The differential amplifier outputs the focusing signal to the focusing control circuit 27. Using the supplied focusing signal, the focusing control circuit 27 excites the driving coil 11, which thereby moves the objective lens 10, effecting the focusing of the laser beam projected on the optical disc 1.

In the state where the focus pull-in process has been carried out, the differential amplifier OP1 supplies the difference between the sum signal of the outputs of the sensing cells 24a, 24d of the optical sensor 24 and the sum signal of the outputs of the sensing cells 24b, 24c of the optical sensor 24 to the tracking control circuit 28 as a tracking error signal. At this time, the changeover switch 42 is switched to the changeover switch 41 side by the tracking polarity switch signal from the CPU 30. This allows the tracking error signal to be supplied via the changeover switches 41, 42 to the phase compensation circuit 44, which then corrects the phase of the tracking error signal to form a tracking driving signal. Thereafter, of the tracking driving signal, only the high-frequency band signals that have passed through the high-pass filter 46 are supplied to the driving circuit 48, and only the low-frequency signals that have passed through the low-pass filter 47 are supplied to the driving circuit 49.

This enables the driving circuit 48 to drive the driving coil 12 according to the tracking driving signal in the high-frequency band, thereby forcing the laser beam from the objective lens 10 to trace the groove, that is, performing the tracking pull-in process. The driving circuit 49 drives the driving coil 7 by controlling the linear motor control circuit 8 according to the tracking driving signal in the low-frequency band, which thereby moves the linear motor 6 in the tracking direction.

Accordingly, the optical head 5 projects a laser beam onto the innermost groove on the optical disc 1.

Thereinafter, the process in accessing a land in a specific track position will be described. The CPU 30 computes the number of tracks to be crossed by the laser beam from the track which the laser beam faces at present to the target track. When the number of tracks to be crossed is large, the linear motor 6 is driven by controlling the linear motor control circuit 8 for accessing. When the number of tracks to be crossed is small, the driving coil 12 is driven by controlling the tracking control circuit 28 for accessing. The linear motor 6 and driving coil are driven as described above so that the laser beam from the optical head 5 may be projected on the groove just near from the land as the target track.

Thereafter, tracking pull-in process is performed as when the optical disc is loaded.

After that, the laser beam moves to the target land from the present groove and then starts to trace the land.

Specifically, when the track on/off signal from the CPU 30 is turned off, this sets the changeover switch 41 in the off position, thereby turning off the tracking servo loop. At this time, the jump pulse from the CPU 30 is supplied to the driving circuit 48 via the adder section 45 and high-pass filter 46. Receiving the jump pulse, the driving circuit 48 drives the driving coil 12, thereby moving the projecting position of the laser beam from the objective lens 10 from the present groove to an outer (adjacent) land. After this movement, the track on/off signal from the CPU 30 is turned on, which sets the changeover switch 41 in the on position, turning on the tracking servo loop.

This enables the laser beam from the objective lens 10 to trace the land.

Specifically, the tracking polarity switch signal from the CPU 30 switches the changeover switch 42 to the polarity inversion circuit 43 side. This enables the tracking error signal to be supplied via the changeover switch 41 to the polarity inversion circuit 43, which then inverts its polarity. The inverted signal is supplied via the changeover switch 42 to the phase compensation circuit 44, which then corrects the phase to produce a tracking driving signal. Thereafter, the tracking driving signal passes through the high-pass filter 46 and is supplied to the driving circuit 48 and passes through the low-pass filter 47 and is supplied to the driving circuit 49.

Then, the driving circuit 48 causes the laser beam from the objective lens 10 to trace the land by driving the driving coil 12 according to the tracking driving signal in the high-frequency band. The driving circuit 49 moves the linear motor 6 in the tracking direction by controlling the linear motor control circuit 8 according to the tracking driving signal in the low-frequency band and driving the driving coil 7.

Preferable techniques for changing the polarity after the tracing on the groove on are as follows:

i) Half track jump is executed after the location of the address has been read ii) Switching is done after (when) the land/groove replacing point has been reached iii) Switching is done after it is verified that the servo system has been stabilized iv) Switching is done after judgment whether the laser beam is on the inside or the outside has been made checking the state immediately after the start of tracking v) Polarity switching method is changed (switching is done by applying the offset voltage) between the case where accessing is done from the outer periphery and the case where accessing is done from the inner periphery.

As described above, when tracking control is started in the state where tracking control is out of operation, that is, when a tracking pull-in operation is carried out, control is first brought into stable tracking control by moving the light spot onto a groove and thereafter, if tracking onto a land is needed, the light spot is moved onto the land.

This enables tracking pull in toward a stable tracking operation for the apparatus using the lens actuator.

<Second Embodiment>

Hereinafter, a second embodiment of the present invention will be explained.

The second embodiment is almost the same as the first embodiment in the basic configuration of optical disc apparatus, focusing control method, and tracking control method.

Figure 7:
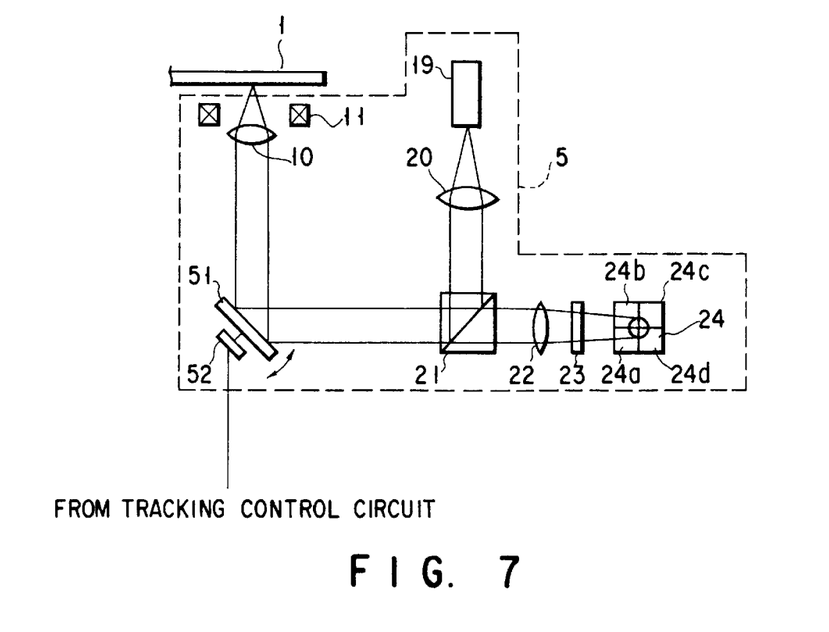
FIG. 7 shows a schematic configuration of an optical head to help explain a second embodiment of the present invention.

As shown in FIG. 7, the second embodiment differs from the first embodiment in that a galvanomirror 51 is used as a tracking actuator in place of the lens actuator using the driving coil 12 for the laser beam. The galvanomirror 51 is provided between the objective lens 10 and the beam splitter 21. The galvanomirror not only reflects the laser beam from the beam splitter 21 and directs it to the beam splitter 21, but also rotates to minutely move the position of the laser beam projected on the optical disc 1 in the direction of the radius of the optical disc 1 (in the direction perpendicular to the track). The galvanomirror 51 is rotated by a rotating section 52, which rotates according to the driving signal from the tracking control circuit 28.

In this case, the tracking error signal necessary for tracking control is obtained as shown in FIGS. 8A and 8B and FIGS. 9A and 9B in the same manner as described in FIGS. 2A to 2D.

Figure 8A:
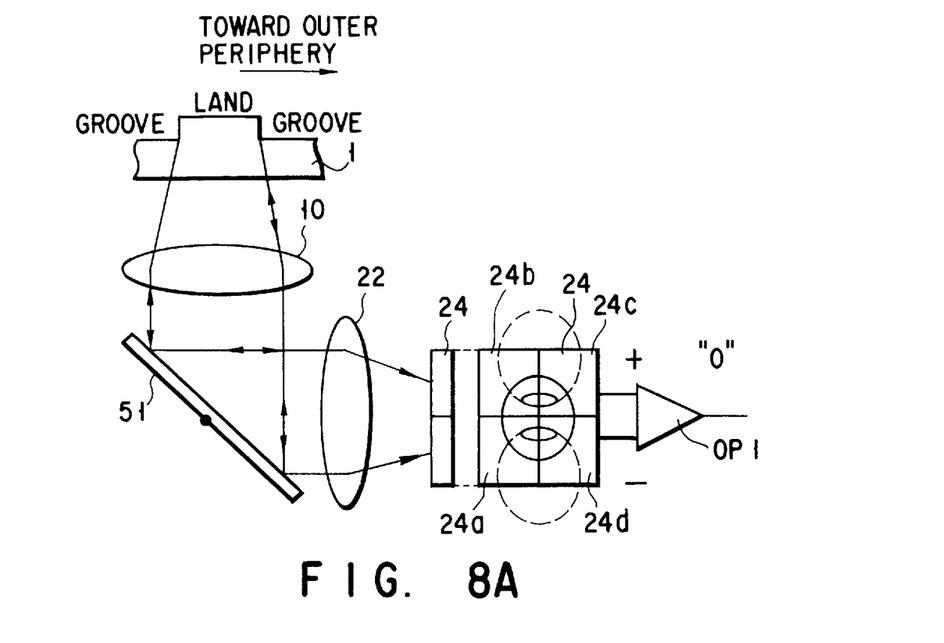
FIGS. 8A and 8B are drawings to help explain the relationship between the laser beam projected on the optical disc and the laser beam projected on the optical sensor.
Figure 8B:
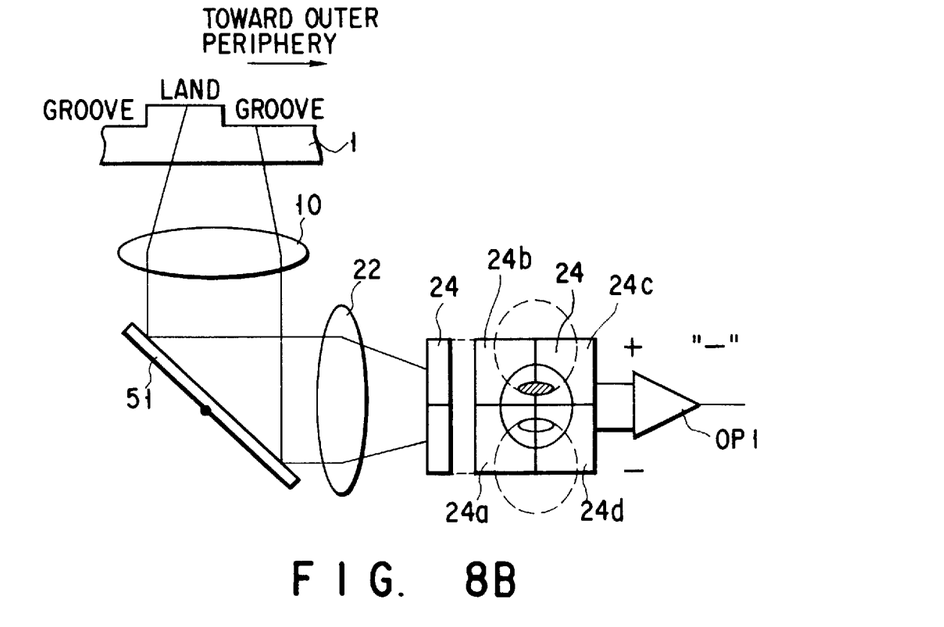
Figure 9A:
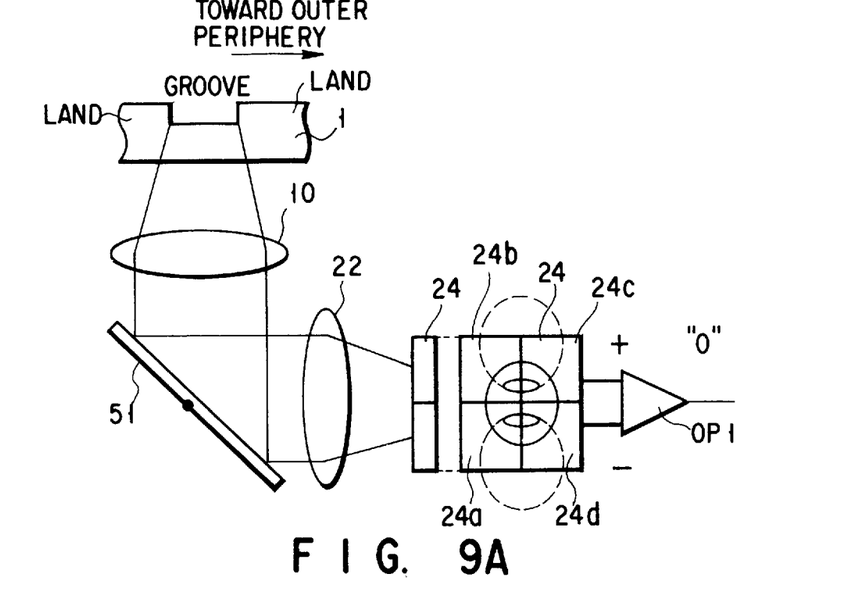
FIGS. 9A and 9B are drawings to help explain the relationship between the laser beam projected on the optical disc and the laser beam projected on the optical sensor.
Figure 9B:
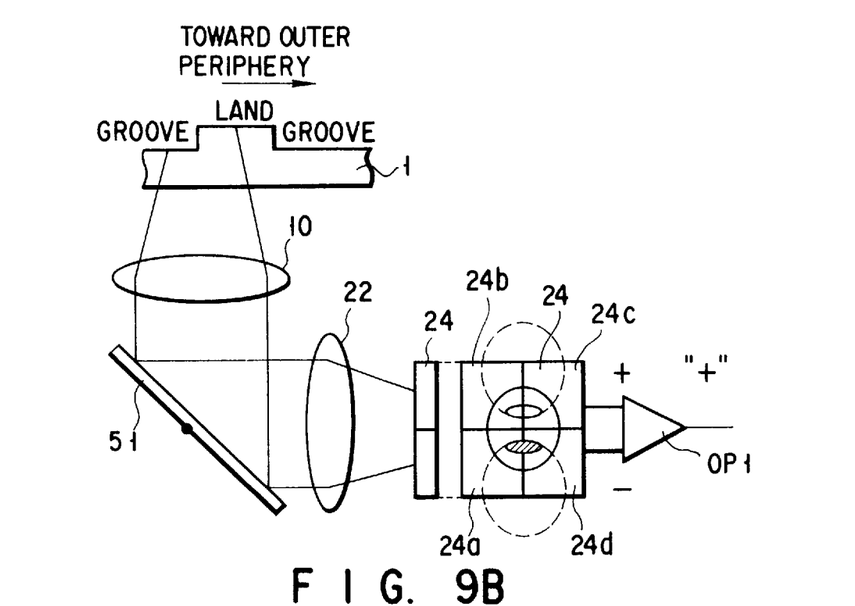

FIGS. 8A and 8B and FIGS. 9A and 9B show the relationship between the target tracking error signal (a tracking error signal containing no offset) obtained in an ideal tracking servo system, the position of the light spot in motion on the optical disc 1, and the position of the light spot on the optical sensor 24 and the galvanomirror. FIG. 8A shows the relationship at the time that the light spot is positioned at the center of a land. FIG. 8B shows the relationship at the time that the light spot is located in the deviated position from a land to the outer periphery. FIG. 9A shows the relationship at the time that the light spot is positioned at the center of a groove. FIG. 9B shows the relationship at the time that the light spot is located in the deviated position from a groove to the outer periphery.

Now, the offset of the tracking error signal by the galvanomirror 51 will be explained by reference to FIGS. 10A and 10B.

Figure 10A:
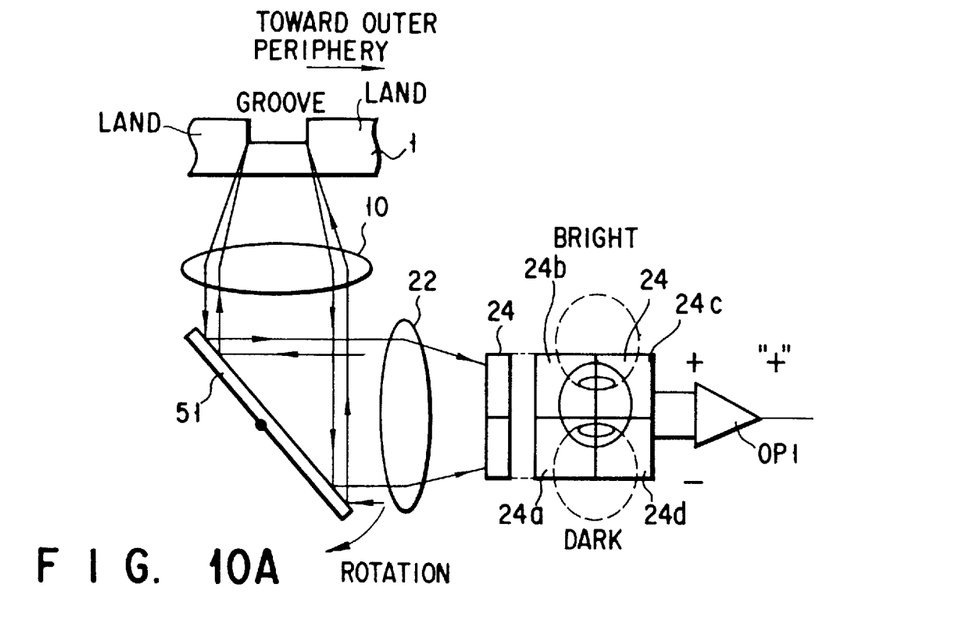
FIGS. 10A and 10B are drawings to help explain the relationship between the laser beam projected on the optical disc and the laser beam projected on the optical sensor.
Figure 10B:
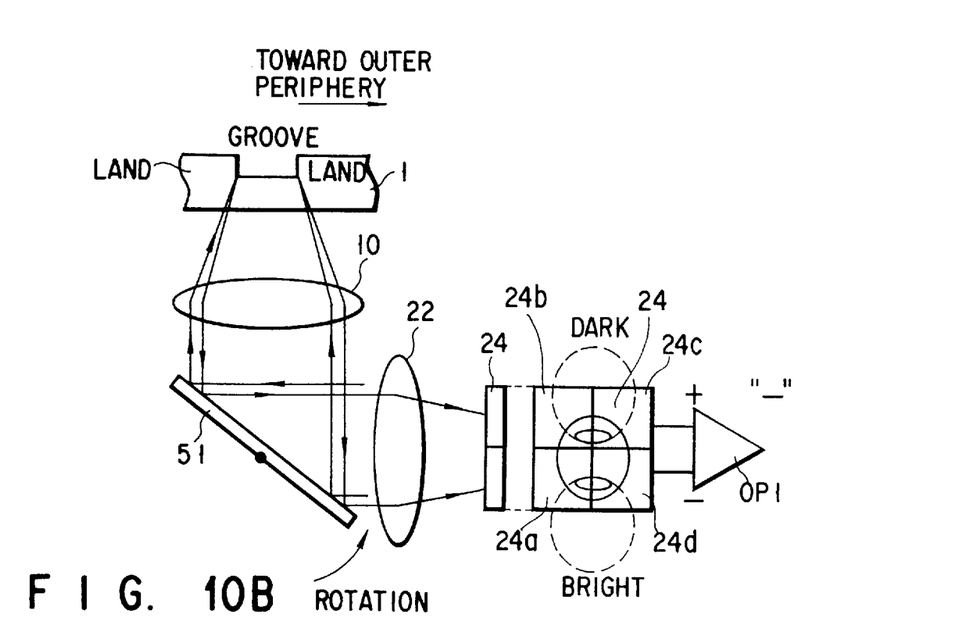

FIGS. 10A and 10B show the relationship between the racking error signal (a tracking error signal containing an offset) obtained in the actual tracking servo system, the position of the light spot in motion on the optical disc 1, and the position of the light spot on the optical sensor 24 and the galvanomirror. FIG. 10A shows the relationship at the time that the galvanomirror rotated to make the light spot reach the center of the groove on the optical disc 1. FIG. 10B shows the relationship at the time that the galvanomirror rotated to make the light spot reach the center of the groove on the optical disc 1.

When the galvanomirror 51 moves the laser beam, this changes the optical relative position between the objective lens 10 and the optical sensor 24, leading to the deviation of the laser beam from the center of the optical sensor 24. As a result, the amount of light incident on the optical sensor 24 deviates from the center. For instance, even when the light spot is at the center of the groove (or land), the tracking error signal does not become zero and has a value of "a". The polarity of "a" depends on the direction in which the laser beam incident on the optical sensor 24 is shifted, regardless of whether the light spot is on the groove or on the land. When an offset occurs in the tracking error signal in this way, the output "a" of the offset of the tracking error signal due to the positional shift of the laser beam causes current to flow through the rotating section 52.

Consequently, depending on the polarity of the offset of the tracking error signal, the laser beam may return to the central position of the objective lens 10 or conversely may move in the direction in which the positional shift increases.

With the configurations shown in FIGS. 8A and 8B, FIGS. 9A and 9B, and FIGS. 10A and 10B, when the position of the light spot deviates from the center of the groove toward the outer periphery of the optical disc 1 as shown in FIG. 9B under the influence of, for example, disturbance while tracking is being done toward the center of the land, a tracking error signal with the "+" polarity is produced. Then, by rotating the galvanomirror 51 according to the signal, the light spot is moved toward the inner periphery of the optical disc 1 as shown in FIG. 10B.

When the laser beam is moved toward the inner periphery by rotating the galvanomirror 51, a "−" polarity offset occurs in the tracking error signal. At this time, when the absolute value of the offset of the tracking error signal is greater than the absolute value of the original tracking error signal, the galvanomirror 51 tries to cause the light spot to move toward the outer periphery, so that the light spot deviates from the center of the groove much more, making the tracking control unstable.

When tracking is started in the state where tracking operation is out of operation (at the time of tracking pull in), the galvanomirror may move significantly because the light spot deviates greatly from the center of the groove. Therefore, there is a particularly strong possibility that the tracking operation will fail at the time of tracking pull in.

Conversely, in a case where tracking is done onto a groove, when the light spot deviates from the center of the land toward the outer periphery of the optical disc 1 under the influence of a disturbance or the like as shown in FIG. 8B, the tracking error signal becomes "−". Since the polarity of control is opposite to that in tracking onto the land, the galvanomirror 51 is rotated in this case, too, which moves the light spot toward the inner periphery of the optical disc 1 as shown in FIG. 10B.

Furthermore, the offset of the tracking error signal produced at the time that the light spot is moved by the galvanomirror 51 toward the inner periphery also has the "−" polarity. Therefore, in a case where tracking is done onto a land, even when the position of the light spot by the galvanomirror 51 deviates from the reference, the negative feedback is applied properly to the galvanomirror, which then tries to return to the original position. As a result, such an unstable phenomenon as is found in tracking onto a land does not occur, enabling stable control.

This makes it possible to start the tracking operation reliably on the land in the case where tracking is started in the state where tracking is out of operation.

Therefore, with the second embodiment, in a case where the galvanomirror is used and tracking control is started in the state where tracking control is out of operation, that is, a tracking pull-in operation is carried out, control is first shifted to stable tracking control by moving the light spot onto a land and thereafter when tracking onto a groove is needed, the light spot is moved onto a groove.

This makes it possible to pull control in a stable tracking operation.

Figure 11:
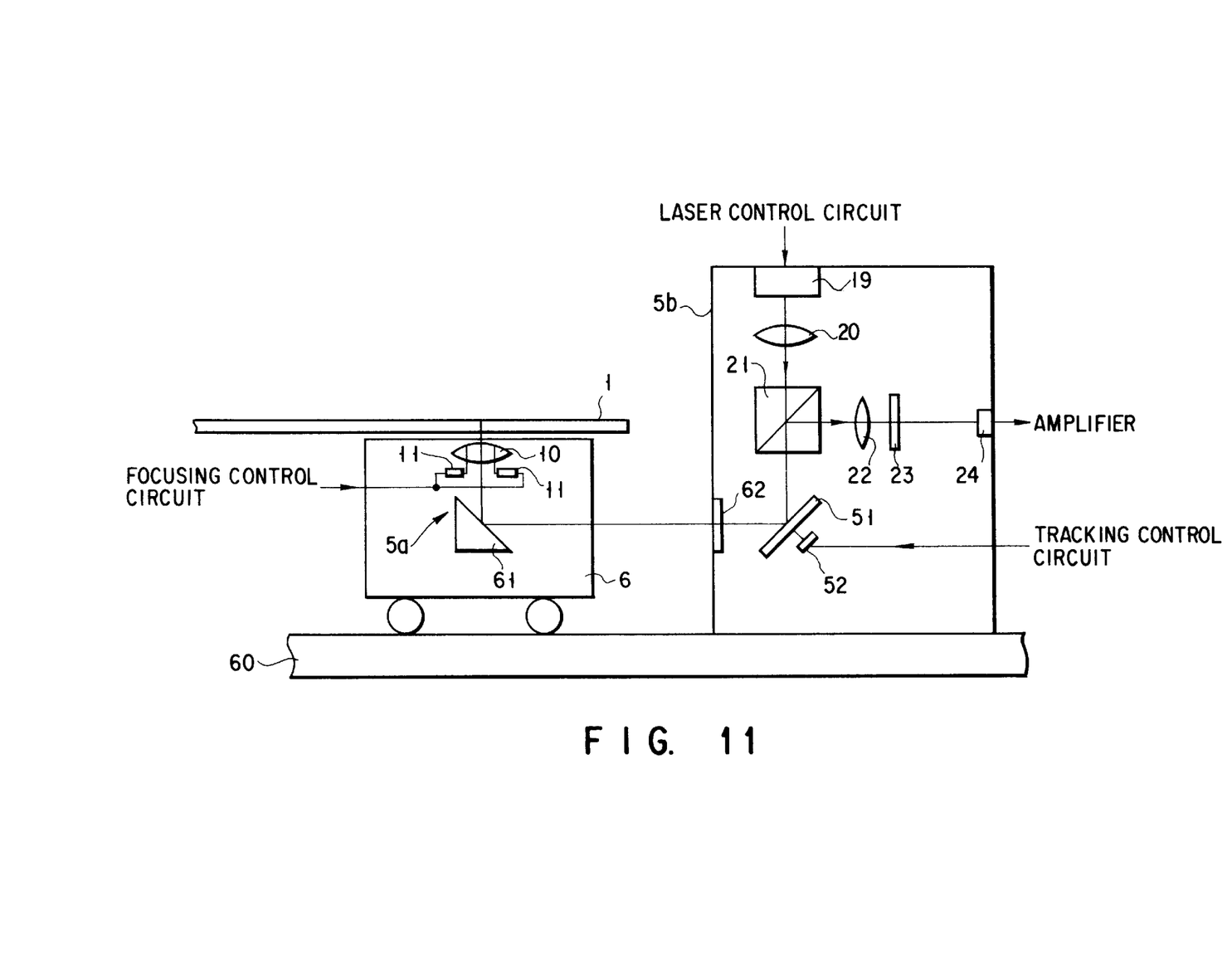
FIG. 11 shows another schematic configuration of the optical head of the second embodiment.

While in the second embodiment, the optical head 5 has an integral structure and is moved by the linear motor 6, the present invention is not limited to this. For instance, the present invention may be applied to an optical head 5 composed of a movable optical system 5a moved by the linear motor 6 and a fixed optical system 5b secured onto the base 60 as shown in FIG. 11.

In this case, the movable optical system 5a comprises an objective lens 10, a focusing driving coil 11, and a raising mirror 61. The fixed optical system 5b comprises a half mirror 62, a laser diode 19 acting as light-emitting means, a beam splitter 21, a galvanomirror 51 acting as a minute-movement actuator, a rotating section 52, and an optical sensor 24.

For example, in the movable optical system 5a, the laser beam directed via the half mirror 62 from the galvanomirror 51 of the fixed optical system 5b is reflected by the raising mirror 61, which raises the beam. The raised beam is directed via the objective lens 10 to the optical disc 1. The reflected light from the optical disc 1 is directed via the objective lens 10 to the raising mirror 61, which reflects the light. This reflected light is directed via the half mirror 62 of the fixed optical system 5b to the galvanomirror 51.

In the fixed optical system 5b, the laser beam from the laser diode 19 is collimated by the collimator lens 20 into a beam of parallel rays of light. This laser beam is directed to the beam splitter 21. The laser beam directed to the beam splitter 21 is reflected by the galvanomirror 51 and then is directed via the half mirror 62, the raising mirror 61, and the objective lens 10 of the movable optical system 5a. The laser beam reflected from the optical disc directed via the objective lens, the raising mirror 61 of the movable optical system 5a and the half mirror 62 is reflected by the galvanomirror 51 and then is reflected by the beam splitter 21 and is directed to the optical sensor 24.

While in the first and second embodiments, explanation has been given with the polarity of the tracking error signal being fixed, the polarity may be reversed, depending on the method of computing the signal. In such a case, the polarity of the offset of the tracking error signal is also reversed, with the result that the relationship between the type of tracking actuator and the types of stable and unstable tracks (land or groove) remains unchanged. Namely, with the lens actuator, tracking control is stable on the groove and with the galvanomirror, tracking control is stable on the land.

As described in detail until now, with the present invention, it is possible to provide an optical disc apparatus capable of performing a tracking operation stably when obtaining a tracking error signal at an optical sensor that senses the balance of the laser beam intensity and then effects tracking control.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical disc apparatus comprising:

laser beam projecting means for projecting a laser beam on grooves formed concentrically on a recording medium or on lands between the grooves so as to form a light spot;

light spot moving means for moving the light spot formed by the laser beam projecting means in a tracking direction crossing the grooves or lands at right angles;

sensing means for sensing an imbalance of a diffracted light intensity due to the groove or lands by receiving a reflected laser beam from the recording medium on which the laser beam has been projected from the laser beam projecting means;

output means for, on the basis of the sensing result of the sensing means, outputting a tracking error signal indicating positional information on the light spot with respect to the grooves or lands in the tracking direction; and control means for controlling an operation of the light spot moving means on the basis of the tracking error signal, the control means including moving means for moving the light spot to either the groove or land for which a polarity of the tracking error signal outputted from the output means when the light spot is deviated from the center of a groove or land on the recording medium by a small displacement actuator driven in one direction coincides with the polarity of an offset contained in the tracking error signal, when the light spot has been formed in a manner that deviates from the center of the sensing means by a small displacement range actuator driven in the opposite direction to the aforementioned direction, and thereafter, moving the light spot to a target groove or land.

2. The apparatus according to claim 1, wherein the control means includes means for performing a tracking pull-in operation in which tracking control is started in a state where tracking control is out of operation.

3. The apparatus according to claim 1, wherein the tracking error signal changes its polarity at the center of the groove or land acting as borderline.

4. The apparatus according to claim 3, wherein the tracking error signal contains an offset that develops as a result of the deviation of the light spot and changes its polarity, depending on the direction of the light spot deviation.

5. An optical disc apparatus comprising:

- an objective lens for projecting a laser beam on grooves formed concentrically on a recording medium or on lands between the grooves so as to form a light spot;
- light spot moving means for moving the light spot in a tracking direction crossing the grooves or lands at right angles by moving the objective lens in a direction perpendicular to an optical axis;
- sensing means for sensing an imbalance of a diffracted light intensity due to the grooves or lands by receiving a reflected laser beam from the recording medium on which the laser beam has been projected from the objective lens;
- output means for, on the basis of the sensing result of the sensing means, outputting a tracking error signal indicating positional information on the light spot with respect to the grooves or lands in the tracking direction; and
- control means for controlling an operation of the light spot moving means on the basis of the tracking error signal, the control means including moving means for first moving the light spot to trace the groove, and thereafter, moving the light spot to either a target groove or land.

6. The apparatus according to claim 5, wherein the control means includes means for performing a tracking pull-in operation in which tracking control is started in a state where tracking control is out of operation.

7. The apparatus according to claim 6, wherein the control means includes means for, when tracking onto a land is needed in performing the tracking pull-in operation, moving the light spot to a groove near from the target land and then moving the light spot to the target land.

8. The apparatus according to claim 5, wherein the tracking error signal changes its polarity at the center of the groove or land acting as borderline.

9. The apparatus according to claim 8, wherein the tracking error signal contains an offset that develops as a result of the deviation of the light spot and changes its polarity, depending on the direction of the light spot deviation.

10. The apparatus according to claim 5, wherein the moving means is for moving the light spot responsive to a comparison of a polarity of the tracking error signal and a polarity of an offset contined in the tracking error signal.

11. An optical disc apparatus comprising:

- a galvanometer for projecting a laser beam on grooves formed concentrically on a recording medium or on lands between the grooves so as to form a light spot;
- light spot moving means for moving the light spot in a tracking direction crossing the grooves or lands at right angles by rotating the galvanomirror;
- sensing means for sensing an imbalance of a diffracted light intensity due to the grooves or lands by receiving a reflected laser beam from the recording medium on which the laser beam has been projected by the galvanomirror;
- output means for, on the basis of the sensing result of the sensing means, outputting a tracking error signal indicating positional information on the light spot with respect to the grooves or lands in the tracking direction; and
- control means for controlling an operation of the light spot moving means on the basis of the tracking error signal, the control means including moving means for moving the light spot to trace the land, and thereafter, moving the light spot to either a target groove or land.

12. The apparatus according to claim 11, wherein the control means includes means for performing a tracking pull-in operation in which tracking control is started in the state where tracking control is out of operation.

13. The apparatus according to claim 12, wherein the control means includes means for, when tracking onto a groove is needed in performing the tracking pull-in operation, moving the light spot to a land near from the target groove and then moving the light spot to the target groove.

14. The apparatus according to claim 11, wherein the tracking error signal changes its polarity at the center of the groove or land acting as borderline.

15. The apparatus according to claim 14, wherein the tracking error signal contains an offset that develops as a result of the deviation of the light spot and changes its polarity, depending on the direction of the light spot deviation.

16. The apparatus according to claim 11, wherein the moving means is for moving the light spot responsive to a comparison of a polarity of the tracking error signal and a polarity of an offset contained in the tracking error signal.

* * * * *